United States Patent

Nolan

[15] 3,699,898
[45] Oct. 24, 1972

[54] CARGO BULKHEAD
[72] Inventor: Matthew P. Nolan, Route 1, P.O. Box 673, Antioch, Ill. 60002
[22] Filed: Dec. 28, 1970
[21] Appl. No.: 101,516

[52] U.S. Cl. ............................ 105/376, 105/369 B
[51] Int. Cl. ...................................... B60p 7/14
[58] Field of Search...105/369 B, 369 S, 369 U, 376; 254/93 R, 93 A, 100, 103; 248/354

[56] References Cited

UNITED STATES PATENTS

| 2,543,175 | 2/1951 | Kilgore | 105/369 B |
| 3,430,922 | 3/1969 | Spencer | 254/93 R |
| 923,463 | 6/1909 | Taylor | 105/369 B |
| 3,362,168 | 1/1968 | Dotlich | 254/93 R |

Primary Examiner—Drayton E. Hoffman
Attorney—Arthur J. Hansmann

[57] ABSTRACT

A H-shaped member having tubular parallel legs and a centrally located cross bar extending between the legs. An assembly of two tubular pieces slidably telescoped in the legs and extends therefrom and includes a cross bar interconnecting the extending ends of the tubular pieces. A jack is connected between the two cross bars for exerting a compressive force therebetween and thereby forcing outwardly on the opposite ends of the entire unit for bracing the unit between spaced-apart walls or the like to have the unit serve as a bulkhead for cargo. A third cross bar extends between the legs of the H-shaped member, and the jack extends through the third cross bar and is guided thereby in the extension and contraction of the jack for operating the bulkhead.

1 Claim, 2 Drawing Figures

PATENTED OCT 24 1972

3,699,898

INVENTOR:
MATTHEW P. NOLAN

ATTORNEY

CARGO BULKHEAD

This invention relates to a cargo bulkhead of the type which is used in railroad box cars and in truck trailers and the like for securing cargo in a fixed position and preventing it from tipping.

BACKGROUND OF THE INVENTION

Cargo bulkheads are commonly known in the shipping industry, and they exist in various forms and structures, including the type which extends between opposite walls of a vehicle or between the ceiling and floor of a vehicle and adjacent the cargo for holding the cargo from sliding or tipping in the vehicle. One such example of prior art cargo bulkhead is shown in U. S. Pat. No. 2,543,175 where telescoping members are employed and are intended to be extended relative to each other for securing the bulkhead in a position to hold the cargo, as mentioned above.

However, the prior art bulkheads are complex in their structure, and they are therefore expensive to manufacture and are even difficult for one man to apply them in the desired positions mentioned. Thus, even the example in the aforesaid patent shows a bulkhead which most likely could not serve its intended function of applying a sufficient compressive force between the opposite ends of the bulkhead for holding the bulkhead in the position of retaining the cargo against sliding and tipping. That is, the patent shows a turnbuckle type of force-applying means which is intended to apply a compressive force, and is readily apparent that the turnbuckle is not designed for applying compressive forces but in fact it would collapse in the application intended in the patent mentioned. Also, the cited patent, and other prior art bulkheads, are further ineffective and poorly designed in that they do not have sufficient strength and stability in a relatively inexpensive, lightweight, and simplified structure, for the purpose intended and as compared to the bulkhead of the present invention.

Accordingly, it is a general object of this invention to provide a bulkhead which is highly efficient, which is simplified in structure, but which is of optimum strength by virtue of its design.

Still further, it is an object of this invention to provide a bulkhead which is of a simplified structure and which can be easily handled and positioned by only one person. In accomplishing this object, the bulkhead of this invention can be positioned in actual contact with the cargo itself, and the bulkhead operating means, in this instance a jack, can still be operated for locking the bulkhead in its secure position and there need not be clearance between the bulkhead and the cargo for operating the force-applying means of the bulkhead.

Still another object of this invention is to provide a bulkhead which has a substantially long length of extension so that the bulkhead can be used in either narrow or wide installations. In this object, even when the bulkhead is at a full extension, it is completely stable and able to transmit the necessary force for holding the bulkhead in a locked position.

Another object of this invention is to provide a bulkhead which has a manually operable force-applying means which has a limit therein for creating the compressive force in the extension of the bulkhead. That is, it should be appreciated that when the bulkheads are positioned between walls, for instance, the problem of providing a force-applying means which will actually damage the walls by forcing them outwardly exists with the prior art bulkheads. In the present invention, limit means are possible and are provided so that the box car, truck, or other vehicle will not be damaged by the operator applying excessive force to the bulkhead.

Other objects and advantages will become apparent upon reading the following disclosure in light of the accompanying drawings.

DETAILED DESCRIPTION OF THE PREFERRED EMBODIMENTS

Figure 1:
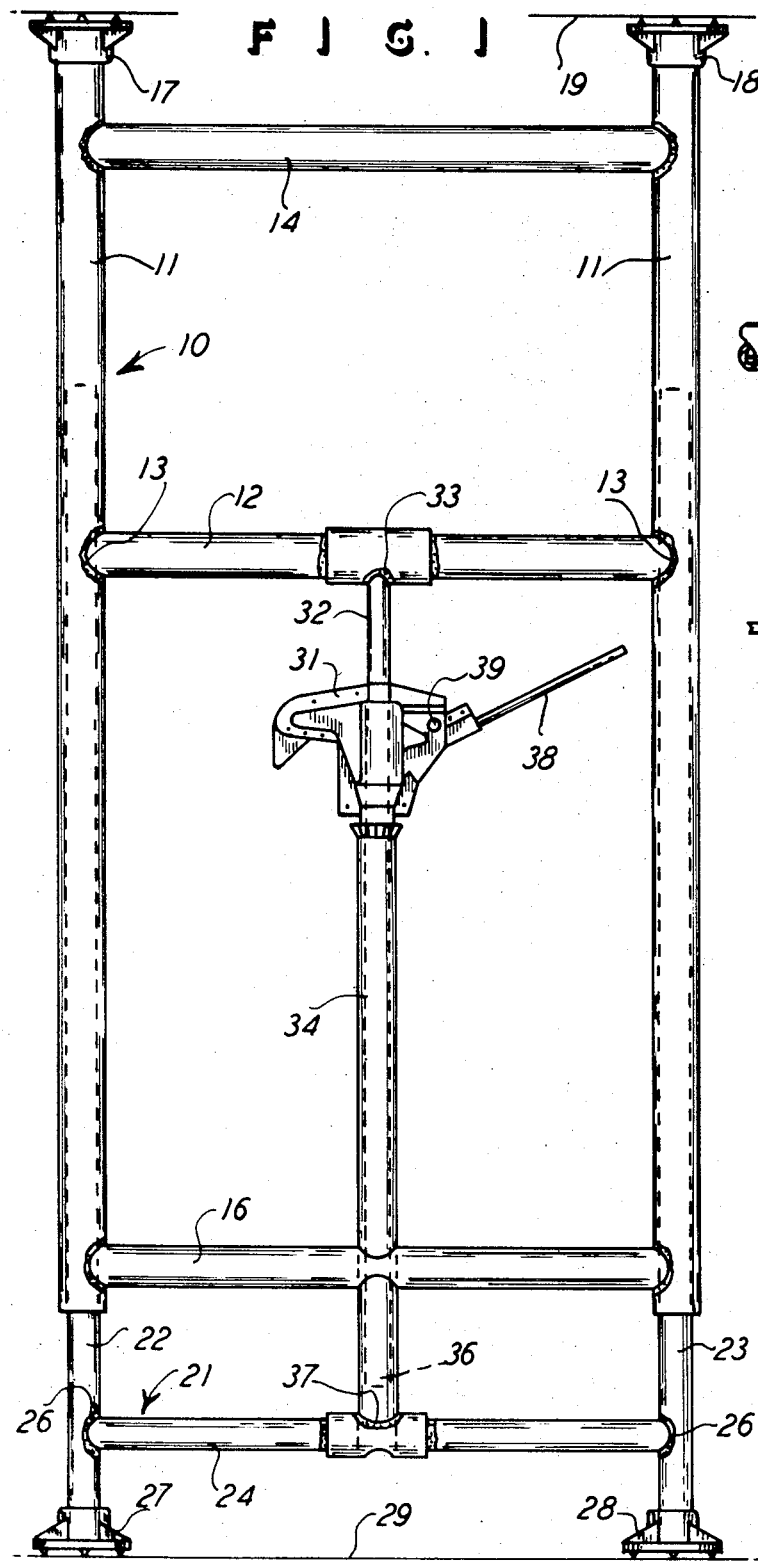
FIG. 1 is a side elevational view of one embodiment of a bulkhead of this invention.

FIG. 1 shows an H-shaped member generally designated 10 and having two spaced-apart and parallel tubular legs 11 extending throughout the length of the member 10. A first cross bar 12 extends between the legs 11 and is connected thereto by weldments 13. Similarly, a cross bar 14 and a cross bar 16 extend between and are connected to the opposite end portions of the legs 11. Also, feet members 17 and 18 are fixed to the upper ends of the legs 11, and the feet 17 and 18 actually are in abutment with the abutment surface designated 19, and such surface 19 may be a wall or a ceiling of a vehicle, depending upon the horizontal or vertical orientation of the H-shaped member 10, as is commonly known in the use of the bulkheads in the industry. Also, it will be understood that cargo, such as boxes or the like, would be adjacent the bulkhead which therefore holds the boxes against tipping and sliding, in the well-known function and manner.

The tubular legs 11 telescopically receive an assembly generally designated 21, and the assembly has two tubular pieces 22 and 23 which are snugly telescoped within the hollow tubular legs 11 as shown by the dotted lines extending along the legs 11. The assembly 21 has a cross bar 24 which is connected between the tubular pieces 22 and 23 by weldments 26. Therefore, just as with the cross bar 16 as related to the legs 11, the cross bar 24 braces the legs 22 and 23 and retains the legs in the desired spacing and parallelism for the telescoping action desired and for the strength of the bulkhead, while requiring only minimum structure and parts. The extending ends of the pieces 22 and 23 have feet 27 and 28 which engage a surface 29, just as the feet 17 and 18 engage the surface 19.

A manually operative jack 31 is included in the bulkhead and has a standard 32 extending into fixed connection with cross bar 12, such as by weldment 33. The standard 32 extends downwardly in FIG. 1 and is telescoped within a tubular piece 34 and terminates at the end designated 36. Thus the standard pieces 32 and 34 are slidably telescoped together, and the jack mechanism shown operates along the fixed standard 32 for moving up and down on the standard 32 and thereby displacing the tubular piece 34. The lower end of the piece 34 is fixedly connected through weldment 37 to the cross bar 24, and thus the assembly 21 is displaced in response to the operation of the jack 31. Also, it will be seen and understood that the standard 34 extends through the cross bar 16 so that the cross bar 16 is arranged to strengthen the bulkhead by connecting between the legs 11 and by guiding the standard 34 in its telescoping action described. Thus the outer diameter of the tubular standard 34 is less than the size of the cross bar 16, at least where the tubular standard 34 passes through the cross bar 16, as shown.

The jack 31 has a conventional construction and is operated by a manually operative handle 38 which moves about the pivot pin 39. Thus the jack 31 can be operated in a position immediately adjacent the cargo, and therefore the bulkhead itself can be positioned in actual contact with the cargo, and such position is the most secure and desirable position.

Figure 2:
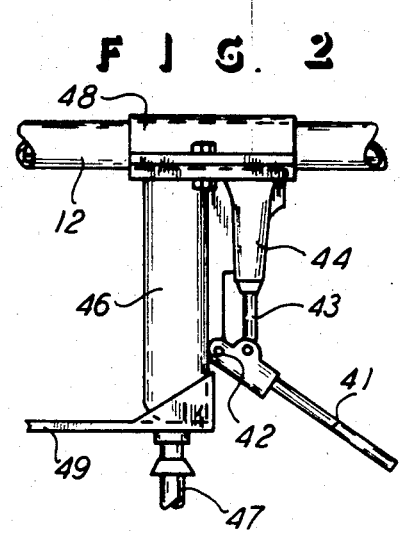
FIG. 2 is a side elevational view of another embodiment of a portion of the bulkhead shown in FIG. 1, and such portion is actually the jack.

FIG. 2 shows a different embodiment of the jack used in the bulkhead, and, in FIG. 2, the jack is shown to be of a hydraulic type. Thus the operating handle 41 is pivotally connected to the unit at the pin 42, and the handle 41 is connected to a shaft 43 extending into a conventional hydraulic pump 44. A hydraulic cylinder 46 is in the usual hydraulic flow communication with the pump 44 so that action of the jack handle 41 will create a piston action in the cylinder 46, and such piston action will cause extension of the standard 47 which is comparable to the moving standard 34 in FIG. 1. Thus FIG. 2 shows that the hydraulic jack is mounted on the cross bar 12 by means of a bracket 48. Also, a supporting brace 49 connects to the hydraulic jack and would actually extend over to the left leg 11, for securing the hydraulic jack on the bulkhead.

With the hydraulic jack described, it is easy to provide a limit to the force that the operator can apply through the jack. That is, the jack can be of the type which transmits only a limited compressive force, so only a limited compressive force can be transmitted through the entire bulkhead. By limiting the force, there is then a minimizing of the danger of pushing the walls or surfaces 19 and 29 away from each other to a point where they are actually permanently damaged. Also, such limiting force-transmitting characteristic could be applied in the mechanically operative jack 31, in any conventional manner.

With the bulkhead described, the jacks in both embodiments are connected between the first cross bar 12 and the second cross bar 24, and the third cross bar 16 is applied for the structural strength and for the guiding of the jack, as described. Also, in the FIG. 1 embodiment, it will be seen that the jack mechanism adjacent to and including the handle 38 would move substantially for the entire length of the standard 32, and thus the bulkhead can be placed in either a short length condition or it can be extended to a substantially long length, since both the lengths of the legs 22 and 23 and the lengths of the members 32 and 34 accommodate the short and long settings described.

What is claimed is:

1. In a cargo bulkhead of the type including an H-shaped member having tubular parallel legs and a centrally located cross bar connected between the legs, an assembly of two tubular pieces slidably telescoped in said legs and extending therefrom and with said assembly including a cross bar interconnected to the extending ends of said tubular pieces, a power means connected between the aforesaid cross bars for extending said tubular pieces outwardly of said legs, the improvement comprising said power means being a manually operated jack having an elongated standard consisting of two telescoping pieces, a third cross bar fixedly connected to said legs at the ends of said legs adjacent said two tubular pieces for securing said legs fixedly spaced apart, said third cross bar having an opening therein oriented parallel to said parallel legs, the outer one of said two telescoping pieces of said jack extending through said opening and being guided by said third cross bar while said jack exerts compressive forces between the first two said cross bars, and, a handle on said jack and pivotal only in the plane wherein said shape member lies, for extension of said assembly by manual action on said handle only in said plane.

* * * * *